(12) United States Patent
Rader, III et al.

(10) Patent No.: US 6,239,509 B1
(45) Date of Patent: *May 29, 2001

(54) METHOD AND APPARATUS FOR VOLTAGE REGULATION IN MULTI-OUTPUT SWITCHED MODE POWER SUPPLIES

(75) Inventors: William Edward Rader, III, Cary; John Fogg, Apex, both of NC (US)

(73) Assignee: Semtech Corporation, Newbury Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/539,275

(22) Filed: Mar. 30, 2000

Related U.S. Application Data

(63) Continuation of application No. 09/354,630, filed on Jul. 16, 1999, now Pat. No. 6,057,607.
(51) Int. Cl.$^7$ ............................................. H02J 3/00
(52) U.S. Cl. ..................... 307/11; 307/33; 323/224; 323/274; 363/16; 363/131
(58) Field of Search ................................ 323/282, 284, 323/224, 274; 363/16, 131; 307/11, 33, 34

(56) References Cited

U.S. PATENT DOCUMENTS

| | | | |
|---|---|---|---|
| 5,532,577 | * 7/1996 | Doluca | 323/282 |
| 5,677,619 | * 10/1997 | Doluca | 323/282 |
| 5,705,919 | * 1/1998 | Wilcox | 323/282 |
| 6,057,607 | * 5/2000 | Rader, III et al. | 307/11 |

* cited by examiner

*Primary Examiner*—Shawn Riley
(74) *Attorney, Agent, or Firm*—Thelen Reid & Priest LLP; David B. Ritchie

(57) ABSTRACT

A step-down switched-mode power supply circuit includes a transformer having at least one primary winding and at least one secondary winding, a current sensing device for sensing a current through a primary winding of the transformer, a first switch and a second switch, a first comparator for determining if the current through the current sensing device exceeds a threshold, a voltage regulator coupled to the secondary winding to produce a regulated voltage, a second comparator for determining if the regulated voltage has drooped below an acceptable level, a counter coupled to the second comparator for generating a signal having a fixed number of switch cycles, and control circuitry for generating signals controlling the first switch and the second switch and responsive to the first comparator to enter a power saving mode disabling the signals, and to the second comparator to temporarily exit the power saving mode for a fixed number of cycles when the regulated voltage has drooped below an acceptable level.

10 Claims, 4 Drawing Sheets

METHOD AND APPARATUS FOR VOLTAGE REGULATION IN MULTI-OUTPUT SWITCHED MODE POWER SUPPLIES

RELATED U.S. APPLICATION DATA

This application is a continuation of U.S. patent application Ser. No. 09/354,630, filed Jul. 16, 1999, now U.S. Pat. No. 6,057,607, issued May 2, 2000.

BACKGROUND OF THE INVENTION

1. Field of the Invention

The present invention is directed to DC—DC switched mode power converters. More particularly, the present invention is directed to a method and apparatus for regulating in a transformer-coupled power supply the output of a secondary stage by controlling the primary output.

2. The Background

Switched mode DC—DC power converters are common in the electronics industry. They are frequently used to convert one available DC level voltage to another DC level voltage, often needed for a particular set of semiconductor chips. Such power converters generally use one or more electrically controlled switches (such as N- or P-Channel MOSFETs) the gates of which are controlled by a switched mode power supply controller circuit which is often integrated onto a single chip.

As electronic devices become faster, smaller and more portable, the need for increased electrical efficiency in DC-DC converters used in these devices is becoming more important. Energy wasted in portable electronics devices prematurely drains the battery powering the device and creates waste heat which must be managed. Relatively small increases in overall electrical efficiency such as from 75% to 85%—result in a major decrease in wasted power and waste heat—e.g., from 25% to 15%. One of the methods commonly used to save power, particularly in portable devices, is to interrupt the operation of a switched mode power supply when there is a low current demand from the supply, and restart the power supply when current demand resumes.

Turning now to FIG. 1, a transformer-coupled step-down power supply or converter is shown schematically. Switches S1 and S2 control the voltage at the phase node, Ø. When S1 is on, the phase node, Ø, is at VIN1 (a first input voltage). When S2 is on, the phase node, Ø, is at ground, 10 (a second input voltage). This type of converter is known as a synchronous pulse width modulation (PWM) converter.

The output filter (here, capacitor C1) averages the voltage at the phase node, Ø, to generate VOUT1, which is typically a DC level voltage. FIG. 2 illustrates the switching waveforms for the circuit of FIG. 1. The waveform for SS1 (switching signal 1 controlling S1) is essentially 180 degrees out of phase with the waveform of SS2 (switching signal 2 controlling S2). It is usually turned off slightly before SS2 activates to prevent a short circuit or cross conduction condition. Vpri switches between VIN1−VOUT1 and −VOUT1 following the SS1 signal. Vpri is the voltage across the primary of transformer T1. Vsec is the voltage across the secondary or output winding of T1 and it is simply the turns ratio (Nsec/Npri) multiplied by Vpri. VOUT1 is filtered by capacitor C1 and thus ramps up when Vpri is available and ramps down when it is not. VOUT2 is powered by the output of the secondary winding of T1 as rectified by diode D1. It is filtered by capacitor C2. Many other configurations of this basic idea are known to those of skill in the art for providing various output voltages, as desired.

It is common practice for modern switched mode power supplies used in battery operated equipment or other applications where efficiency and power saving capabilities are paramount to utilize various switching modes in order to optimize the efficiency of the power supply over a wide range of load currents. The switched mode power supply will typically operate at a fixed frequency to allow easy selection of output filter components, but as the load current is reduced, the converter will enter a "power save" mode which drops switching cycles, conserving the gate charge energy associated with switching the power bridge. If a transformer coupled output stage is used, the secondary output is unregulated when the primary stops switching in power save mode. Since the careful regulation of the secondary output voltage can be critical in some applications, this poses a problem.

Turning to FIG. 3, a circuit known in the art which uses one method to solve the problem of loss of secondary regulation in a power supply is shown. In the circuit shown in FIG. 3 the output of the secondary winding 12 of transformer T1 is used with the rectifying function of diode D1 to generate the input voltage to a conventional linear regulator 14 having, for example, an IN terminal for connection to a power supply voltage such as VOUT2, a REF terminal for connection to a source of a reference voltage, a REG output terminal for output of a regulated voltage level and a FB feedback input terminal for connection to the is regulated output voltage level, such as VOUT3, for sensing that voltage level.

A current sense device, such as resistor Rcs, is used to determine the primary supply output current. Note that many ways of sensing current are known. In the embodiment shown in FIG. 3, Rcs is connected between the terminals of Op Amp 22 to provide an output signal on line 24 to control circuitry 16. When the primary supply output current drops below a predetermined level, the control circuitry 16 stops issuing signals SS1 and SS2 which, in turn, stops switching switches S1 and S2. Under these conditions, when the linear regulator output VOUT3 is heavily loaded, the secondary output VOUT2 will droop. Comparator AR1 compares VOUT2 with a predetermined reference level "REF". When the droop is sufficient that VOUT2 drops below REF, a single primary side switching cycle is generated. The first event is typically to turn on the synchronous switch S2 for a fixed period of time by generating a pulse with a one shot device 18 which is, in turn, connected to one input of an OR gate 20. The other input of OR gate 20 is connected to SS2. This allows the primary control loop to bypass its power save mode circuitry, which would turn the primary switcher off under normal conditions due to the light load on the primary.

Turning on S2 transfers energy from the primary output capacitor C1 to the secondary output capacitor C2. Comparator AR1 monitors the rising input voltage VOUT2 to the linear regulator 14 with the hysteresis of the comparator determining the level to which VOUT2 is raised. When the secondary output voltage VOUT2 is pumped up and detected by comparator AR1, the secondary regulation signal becomes inactive and the primary control loop returns to the power save mode, dropping switching signals when possible in order to improve efficiency. So when comparator AR1 decides that the voltage droop on VOUT2 is too much, a single pulse is generated to cause the switcher to execute one cycle, recharging the capacitor filters and reducing the droop. Comparator AR1 will continue to cause pulses to be generated for so long as VOUT2 is below REF.

Another prior circuit applies one or more pulses to the S2 and/or S1 switches and uses a comparator to sense droop on VOUT2 to determine when to stop sending the pulses. During this time the power supply does not reenter synchronous conduction mode where the switching of S1 and S2 is complementary.

SUMMARY OF THE INVENTION

A step-down switched-mode power supply circuit includes a transformer having at least one primary winding and at least one secondary winding, a current sensing device for sensing a current through a primary winding of the transformer, a first switch and a second switch, a first comparator for determining if the current through the current sensing device exceeds a threshold, a voltage regulator coupled to the secondary winding to produce a regulated voltage, a second comparator for determining if the regulated voltage has drooped below an acceptable level, a counter coupled to the second comparator for generating a signal having a fixed number of switch cycles, and control circuitry for generating signals controlling the first switch and the second switch and responsive to the first comparator to enter a power saving mode disabling the signals, and to the second comparator to temporarily exit the power saving mode for a fixed number of cycles when the regulated voltage has drooped below an acceptable level.

DETAILED DESCRIPTION OF THE INVENTION

Those of ordinary skill in the art will realize that the following description of the present invention is illustrative only and not in any way limiting. Other embodiments of the invention will readily suggest themselves to such skilled persons after a perusal of this disclosure.

Figure 4:
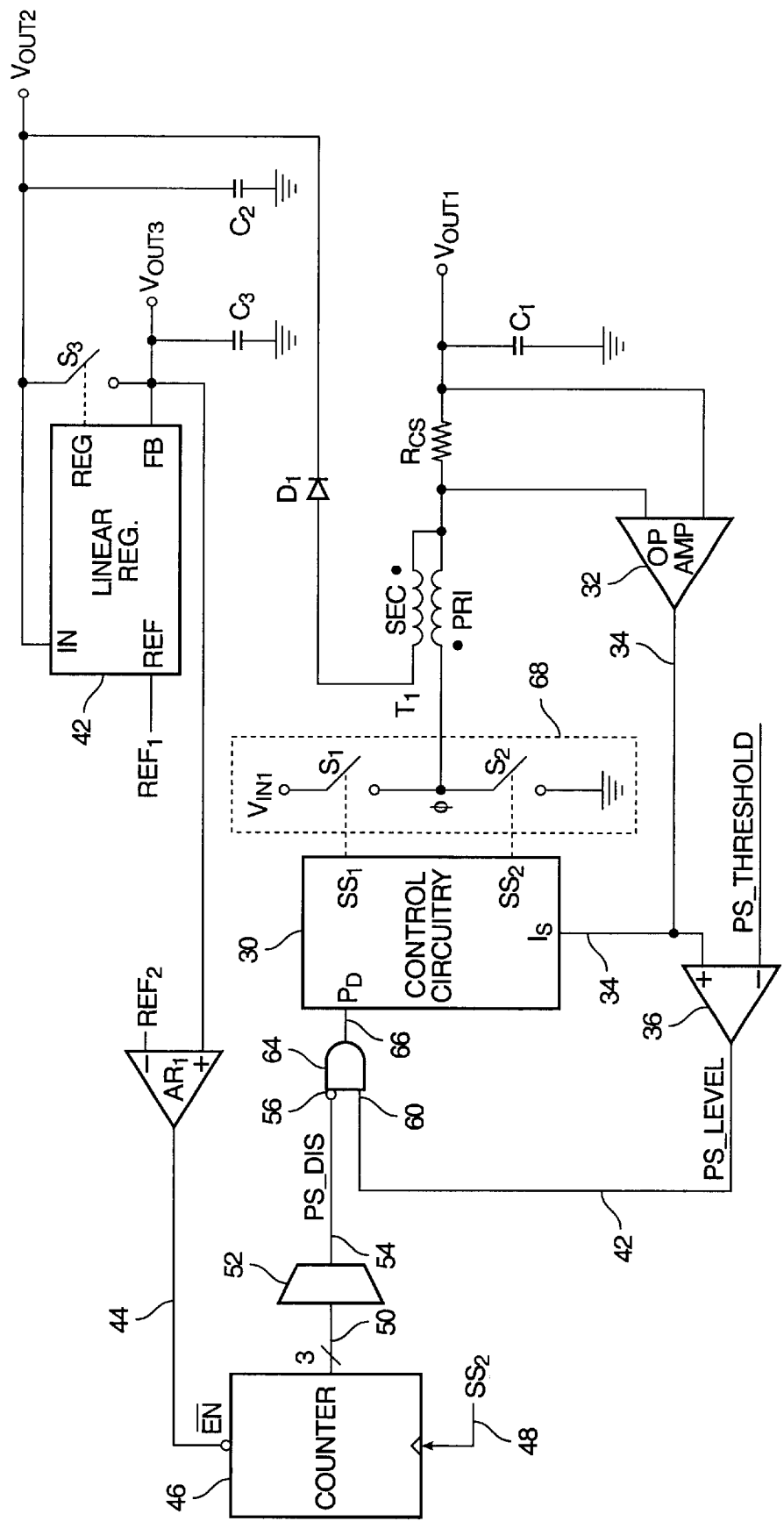
FIG. 4 is an electrical schematic diagram of a step-down switched-mode power supply circuit in accordance with a presently preferred embodiment of the present invention.

Turning now to FIG. 4, a presently preferred embodiment of the present invention is shown in schematic diagram form. Control circuitry 30 operates in a conventional manner to generate synchronous pulse width modulation (PWM) switching signals SS1 and SS2 which are out of phase to prevent cross conduction. For example, control circuitry 30 may be a MAXIM 1632 available from Maxim Integrated Products, Inc. of Sunnyvale, Calif., a Semtech SC1402 available from Semtech of Newbury Park, Calif., or any equivalent device. A current measuring device, such as a resistor Rcs is used to measure current on the primary (VOUT1). An operational amplifier (op amp) 32 may be used to provide a signal on line 34 which is derived from the current in the primary. Many other ways are known to sense current and any suitable current sensing device or circuit may be used. Comparator 36 compares the signal on line 34 with a PS_THRESHOLD signal and generates a PS_LEVEL signal on line 42. PS_THRESHOLD is a voltage representative of a current level. For example, PS_THRESHOLD may be set to 30 mV and when the positive input to comparator 36 on line 34 is less than 30 mV then PS_LEVEL will signal that the power supply should enter power save mode. PS_LEVEL is "1" if power save mode is to be entered and "0" if power save mode is not to be entered or, if on, is to be exited, and is provided on line 42. Control circuitry 30 enters a power save mode when the current through the current measuring device is below a certain preset threshold as presented to control circuitry 30 through the "Is" input on line 34.

Transformer T1, which may be connected in any suitable way has one or more primary windings and one or more secondary windings. T1 may be any magnetically coupled pair of windings, such as a pair of windings wound on the same magnetic core. At least one secondary winding is rectified and filtered, as with diode D1 and capacitor C2, or in any other suitable manner to provide VOUT2. VOUT2 is then provided to an input terminal of a voltage regulator device 42, such as a linear regulator. An output of voltage regulator device 42 provides VOUT3 in a conventional manner, for example, as shown in FIG. 4. A reference voltage REF1 is applied to voltage regulator device 42 to establish a reference against which VOUT3 is regulated. When in power save mode, the voltage VOUT3 will begin to droop, as before. A secondary regulation comparator AR1 is provided to monitor the output of voltage regulator 42 (VOUT3). When VOUT3 drops by a percentage determined by input voltage REF2 supplied to AR1 (REF2 is less than REF1 by a percentage determined by the required regulation level for VOUT3), comparator AR1 signals the main control loop over line 44 to exit power save mode and begin switching. Under these conditions a simple counter 46 is used to provide a power save disable ("PS_DIS") signal to control circuitry 30 until a given number of synchronous switching cycles have been completed. If VOUT3 is back in regulation at the completion of the given number of switching signals, the PS_DIS signal is removed and power save mode is reentered. If not, the process repeats for a second time applying the given number of switching cycles, and so on, until AR1 stops signaling on line 44 that VOUT3 is out of regulation.

Counter 46 is a simple counter strobed by input line 48. Input line preferably carries a signal pulse which cycles once per switching cycle. Other signals could be used, as long as they bear some relationship to the number of switching cycles that have taken place. For example, counter 46 may be strobed by SS2 or by SS1. In one embodiment, counter 46 may be a 3-bit counter counting from 0 to 7 or 7 to 0. A 3-bit output on line 50 is applied to logic 52 which may be any suitable circuit, to provide the PS_DIS signal on line 54. Logic 52 simply holds PS_DIS at a particular logic level, here illustrated as "0", while the counter is cycling back to its initial value, e.g., 0. Thus, once initiated, PS_DIS is low on line 54 for whatever number of clock pulses that counter 46 is set to count through. In one embodiment of the present invention, PS_DIS on line 54 and PS_LEVEL on line 42 are combined in logic (shown as AND gate 64, but any suitable logic may be used) to yield a signal on line 66 for disabling power save mode when it is not appropriate. In this embodiment PS_DIS is inverted at input 56 to AND gate 64. Those of ordinary skill in the art will now realize that many different approaches can be used to get the output of the counter to temporarily disable the power save mode for a fixed number of synchronous switching cycles.

Figure 1:
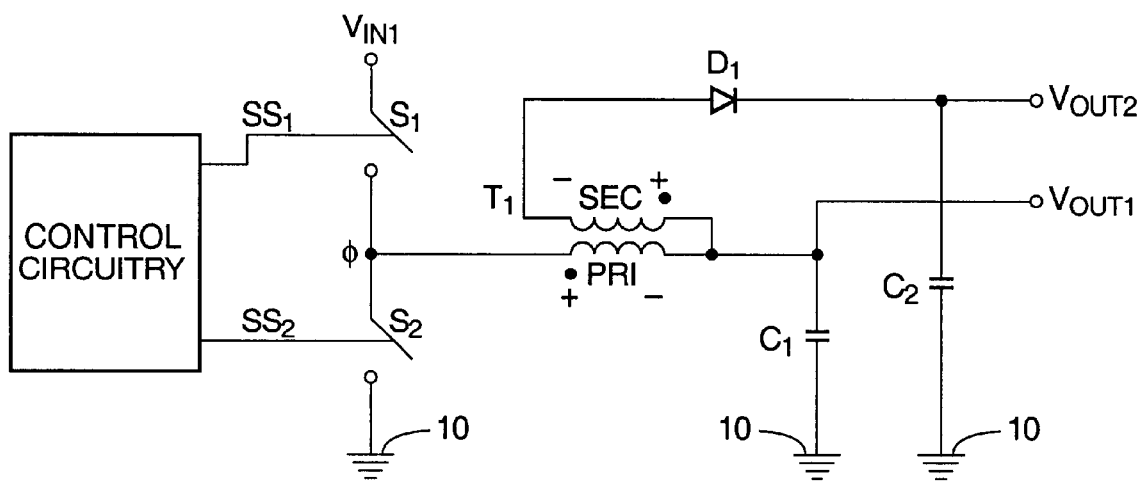
FIG. 1 is an electrical schematic diagram of a buck converter circuit in accordance with the prior art.
Figure 2:
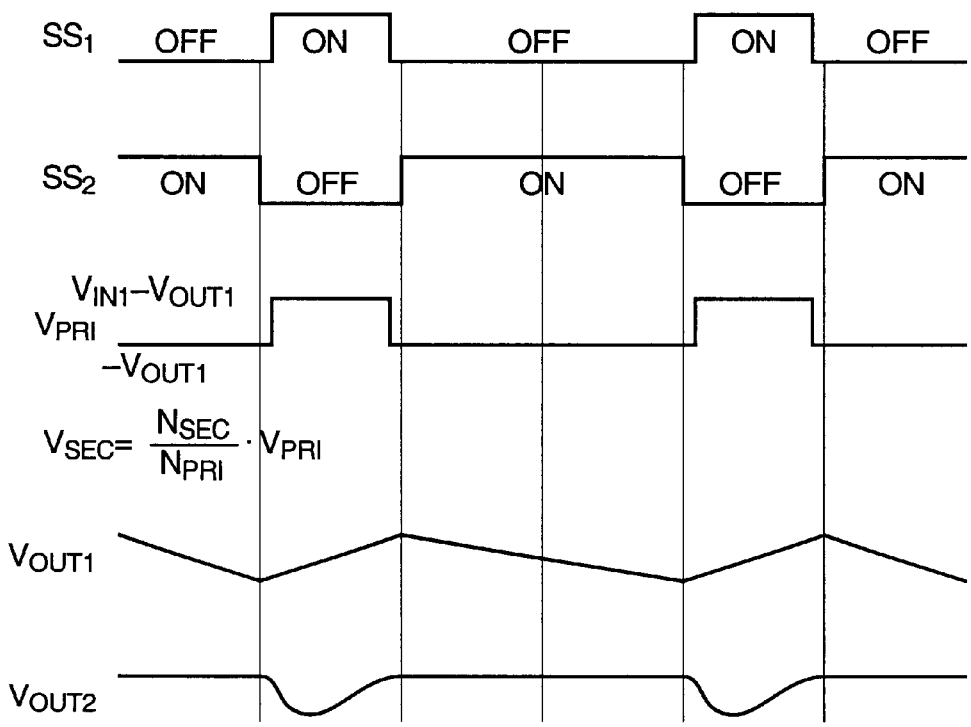
FIG. 2 is a set of plots of the behavior of waveforms signals SS1, SS2, Vpri, Vsec, VOUT1 and VOUT2 vs. time.
Figure 3:
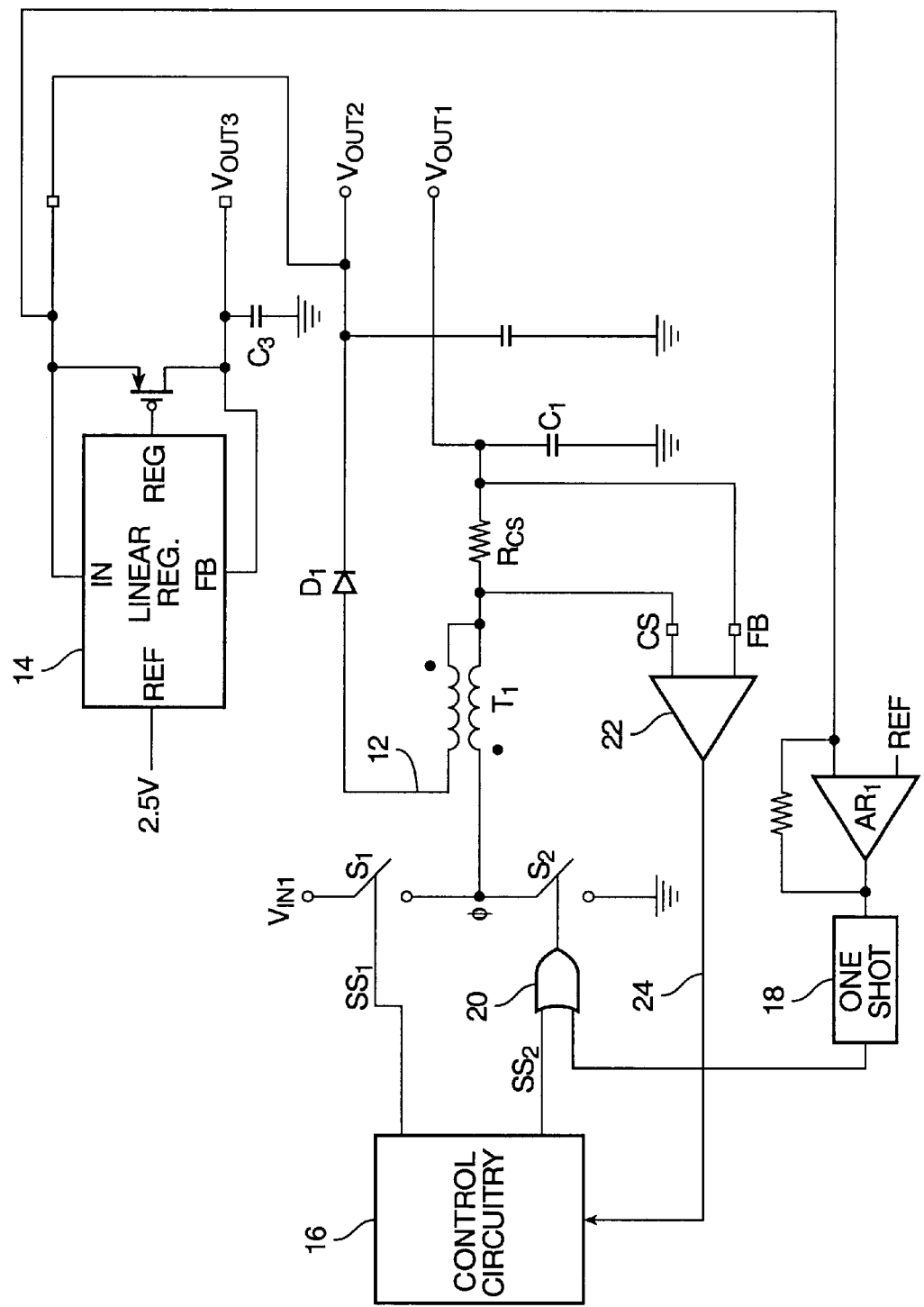
FIG. 3 is an electrical schematic diagram of a step-down switched-mode power supply circuit in accordance with the prior art.

The complexity of added circuitry for fixed duration pulses on the SS2 control signal as discussed in relation to the FIG. 3 embodiment is thus eliminated by utilizing fixed frequency operation of the primary for a predetermined number of cycles initiated by detecting that VOUT3 is out of regulation. In fixed frequency mode, the control signals SS1 and SS2 are always complimentary and the power save mode is disabled for the predetermined number of cycles.

Figure 5A:
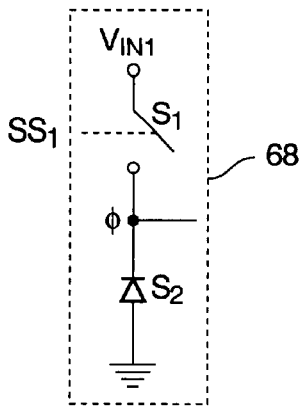
FIGS. 5A, 5B and 5C are schematic diagrams of alternative switch blocks 68 corresponding to switch block 68 of FIG. 4
Figure 5B:
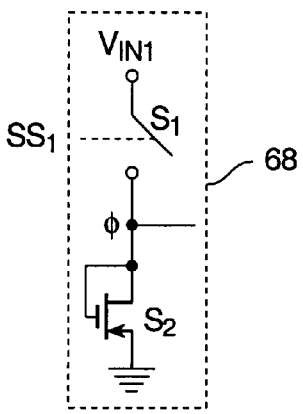
Figure 5C:
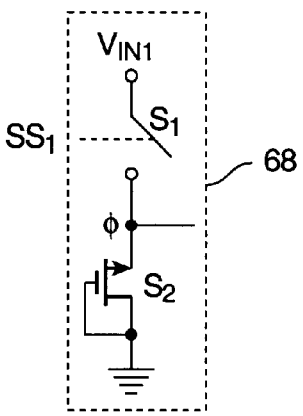

There are two primary benefits of monitoring the output of the linear regulator instead of the rectified voltage VOUT2. First, if this circuit is used in an integrated circuit, the pass device (a switch S3 the control gate of which is connected to the REG output of the linear regulator block— It is called a pass device because it passes current from the input (VOUT2) to the output (VOUT3)) for the linear regulator is often an external (off of the IC) power device such as a MOSFET. In this case, an extra pin is required to bring VOUT2 into the IC for monitoring when it might not otherwise be required. Since pin counts are always an issue, avoiding the use of a pin is usually beneficial. In this vein, operating the converter in synchronous conduction mode also enables S2 to be a diode instead of a transistor. Because there will always be current flowing through the inductor, the diode will have to conduct current whenever S1 turns off. This version of the circuit is shown in FIGS. 5A, 5B and 5C, which show alternative embodiments for circuit block 68 of FIG. 4. Second, the efficiency of the overall system can be improved. By selecting the allowed droop on the linear regulator output with reference voltage REF2 applied to comparator AR1, the power save duration can be stretched to its maximum length, while also ensuring that the linear regulator output remains within specification. The linear regulator output (VOUT3) accuracy is typically the specification of concern, as opposed to the accuracy of the rectified output from the secondary winding (VOUT2). By monitoring the linear regulator output directly, rather than indirectly, the droop is controlled by the REF2 input to comparator AR1 and the maximum delay before disabling the power save mode can be achieved, thus yielding the best efficiency.

If an external pass device is used for S3, the level of VOUT2 which is required to achieve an acceptable value of VOUT3 is proportional to the effective on-resistance of the pass device and the current that a load sinks from VOUT3. The value of VOUT2 at which VOUT3 is unable to maintain regulation is called the drop-out of the linear regulator. This invention achieves a high efficiency by allowing VOUT2 to droop to the minimal level that its dropout allows before the control circuitry comes out of power save mode.

Another advantage of the invention is that if the linear regulator is internal to the control IC, like on the 1630 and the 1402 control ICs discussed above, then there is already a resistor divider on the IC to compare VOUT3 to a reference voltage for control of the linear regulator. Another tap off of this divider can be compared to the same reference voltage to sense when VOUT3 is too low. This can save a significant amount of area on the IC because very large value resistors are needed to improve efficiency in portable applications.

Alternative Embodiments

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A step-down switched-mode power supply circuit having a transformer including at least one primary winding and at least one secondary winding, a current sensing device for sensing a current through the primary winding of the transformer, a first switch, a second switch, a voltage regulator coupled to the secondary winding of the transformer to produce a regulated voltage on an output line, and control circuitry for generating a pair of complimentary signals controlling the first switch and the second switch, the circuit comprising:

a first comparator for determining if the current through the current sensing device exceeds a threshold;

a second comparator coupled to the output line of the voltage regulator for determining if the regulated voltage has drooped below an acceptable level; and a counter coupled to the second comparator for asserting a power save disable signal for a fixed number of switch cycles when the second comparator determines that the regulated voltage has drooped below the acceptable level, wherein the control circuitry is responsive to the first comparator to enter a power saving mode disabling the complimentary signals and is responsive to the power save disable signal to temporarily exit the power saving mode while the power save disable signal is asserted.

2. A step-down switched-mode power supply circuit having a first voltage input node for receiving a first voltage level, a second voltage input node for receiving a second voltage level, a first switch and a second switch, the first switch connecting the first voltage node to a phase node when the first switch is active and the second switch connecting the second voltage node to the phase node when the second switch is active, a pulse width modulated synchronous switching control circuit generating a first switching signal and a second switching signal, the first switching signal and the second switching signal being complementary, the first switching signal controlling the first switch and the second switching signal controlling the second switch, a transformer having at least one primary winding and at least one secondary winding, the primary winding coupled to the phase node and to a current sensing device for sensing a current through a primary winding of the transformer, and a voltage regulator coupled to the secondary winding to produce a regulated voltage on an output line, the circuit comprising:

a first comparator for determining if the current through the current sensing device exceeds a threshold;

a second comparator coupled to the output line of the voltage regulator for determining if the regulated voltage has drooped below an acceptable level; and a counter coupled to the second comparator for asserting a power save disable signal for a fixed number of switch cycles when the second comparator determines that the regulated voltage has drooped below the acceptable level, wherein the control circuit responsive to the first comparator to enter a power saving mode disabling the first switching signal and the second switching signal and is responsive to the power save disable signal to temporarily exit the power saving mode while the power save disable signal is asserted.

3. A step-down switched-mode power supply circuit having a first voltage input node for receiving a first voltage level, a second voltage input node for receiving a second voltage level, a pulse width modulated switching control circuit, a transformer having at least one primary winding and at least one secondary winding with the primary winding coupled to a phase node and to a current sensing device for sensing a current through the primary winding of the transformer, and a voltage regulator coupled to the secondary winding of the transformer to produce a regulated voltage on an output line, the circuit comprising:

a first switch for connecting the first voltage node to the phase node when the first switch is active wherein the first switch is controlled by a switching signal from the pulse width modulated switching control circuit;

a second switch for connecting the second voltage node to the phase node when the second switch is active;

a first comparator for determining if the current through the current sensing device exceeds a threshold;

a second comparator coupled to the output line of the voltage regulator for determining if the regulated voltage has drooped below an acceptable level; and a counter coupled to the second comparator for asserting a power save disable signal for a fixed number of switch cycles when the second comparator determines that the regulated voltage has drooped below the acceptable level, wherein the control circuit is responsive to the first comparator to enter a power saving mode disabling the switching signal and is responsive to the power save disable signal to temporarily exit the power saving mode while the power save disable signal is asserted.

4. The circuit as defined in claim 3, wherein the second switch is a diode.

5. The circuit as defined in claim 3, wherein the second switch is a transistor connected to form a diode.

6. A step-down switched-mode power supply circuit having a first switch and a second switch alternately coupling a primary winding of a transformer to a first input voltage and a second input voltage, the transformer also having a secondary winding, a current sense element connected to measure a current through the primary winding, and a voltage regulator powered by the secondary winding for providing a regulated voltage, the circuit comprising:

means for causing the first switch and the second switch to stop switching and to disengage both the first input voltage and the second input voltage from the primary winding of the transformer in response to detecting a current below a threshold with the current sense element; and means for comparing the regulated voltage with a reference voltage level to determine if the regulated voltage has drooped below the reference voltage and, if so, causing the first switch and the second switch to cycle through a fixed number of switching cycles.

7. A step-down switched-mode power supply circuit having a first switch and a second switch switching by alternately coupling a primary winding of a transformer to a first input voltage node and a second input voltage node, the transformer also having a secondary winding, a current sense element connected to measure a current through the primary winding, and a voltage regulator powered by the secondary winding for providing a regulated voltage, the circuit comprising:

means for detecting with the current sense element a low current demand condition of the circuit;

means for causing the first switch and the second switch to stop switching and to disengage both the first input voltage and the second input voltage from the primary winding of the transformer in response to the means for detecting;

means for comparing the regulated voltage with a reference voltage level to determine if the regulated voltage has drooped below the reference voltage and, if so, asserting a signal to temporarily restart switching; and means for restarting temporarily, responsive to the asserted signal, the switching of the first switch and the second switch for a fixed number of switching cycles.

8. The circuit as defined in claim 7, wherein the means for restarting further comprises:

means for causing a counter to count for a fixed number of cycles;

means for strobing the counter with a switching signal tracking at least one switching signal applied to at least one of the first switch and the second switch; and means for asserting a power save disable signal while the counter is counting.

9. The circuit as defined in claim 8, wherein the means for causing a counter to count includes means for loading a value into the counter and allowing it to count down to zero.

10. The circuit as defined in claim 8, wherein the means for causing a counter to count includes means for zeroing the counter and allowing it to count to a predetermined value other than zero.

* * * * *

UNITED STATES PATENT AND TRADEMARK OFFICE
CERTIFICATE OF CORRECTION

PATENT NO. : 6,239,509 B1  Page 1 of 1
DATED : May 29, 2001
INVENTOR(S) : William Edward Rader III; John Fogg It is certified that error appears in the above-identified patent and that said Letters Patent is hereby corrected as shown below:

Column 2,
Line 26, delete "is".

Signed and Sealed this

Fifteenth Day of January, 2002

Attest:

JAMES E. ROGAN
Attesting Officer   Director of the United States Patent and Trademark Office